United States Patent
Bronnimann et al.

(10) Patent No.: US 7,933,208 B2
(45) Date of Patent: Apr. 26, 2011

(54) FACILITATING STORAGE AND QUERYING OF PAYLOAD ATTRIBUTION INFORMATION

(75) Inventors: Herve Bronnimann, New York, NY (US); Nasir Memon, Holmdel, NJ (US); Kulesh Shanmugasundaram, Bronx, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 783 days.

(21) Appl. No.: 11/236,309

(22) Filed: Sep. 27, 2005

(65) Prior Publication Data
US 2006/0072582 A1 Apr. 6, 2006

Related U.S. Application Data (60) Provisional application No. 60/613,596, filed on Sep. 27, 2004.

(51) Int. Cl.
*H04J 3/14* (2006.01)
*H04L 29/06* (2006.01)
*G08B 29/06* (2006.01)

(52) U.S. Cl. ............................ 370/241; 713/154; 726/24

(58) Field of Classification Search ............. 370/395.32, 370/395.6, 395.65, 400–403, 474, 521
See application file for complete search history.

(56) References Cited

U.S. PATENT DOCUMENTS

| | | | | |
|---|---|---|---|---|
| 5,305,317 | A * | 4/1994 | Szczepanek | 370/257 |
| 5,819,291 | A * | 10/1998 | Haimowitz et al. | 707/201 |
| 5,920,900 | A * | 7/1999 | Poole et al. | 711/216 |
| 6,820,114 | B2 * | 11/2004 | Brendle | 709/213 |
| 6,959,384 | B1 * | 10/2005 | Serret-Avila | 713/176 |
| 7,155,502 | B1 * | 12/2006 | Galloway et al. | 709/223 |
| 7,328,349 | B2 * | 2/2008 | Milliken | 713/181 |
| 7,444,515 | B2 * | 10/2008 | Dharmapurikar et al. | 713/176 |
| 7,454,418 | B1 * | 11/2008 | Wang | 707/6 |

OTHER PUBLICATIONS

Zhu, Yifeng et al., "Hierarchical Bloom Filter Arrays (HBA): A Novel, Scalable Metadata Management System for Large Cluster-based Storage", IEEE, Cluster Computing, pp. 165-174, Sep. 20-23, 2004.*

Wang, Qiang, Fast Signature Scan, U.S. Appl. No. 60/518,032, filed Nov. 7, 2003.*

* cited by examiner

*Primary Examiner* — Daniel J Ryman
*Assistant Examiner* — Cassandra Decker
(74) *Attorney, Agent, or Firm* — John C. Pokotylo; Straub & Pokotylo (57) ABSTRACT

A hierarchical data structure of digested payload information (e.g., information within a payload, or information spanning two or more payloads) allows a payload excerpt to be attributed to earlier network flow information. These compact data structures permit data storage reduction, while permitting efficient query processing with a low level of false positives. One example of such a compact data structure is a hierarchical Bloom filter. Different layers of the hierarchy may correspond to different block sizes.

7 Claims, 10 Drawing Sheets

FACILITATING STORAGE AND QUERYING OF PAYLOAD ATTRIBUTION INFORMATION

§0. PRIORITY CLAIM

Benefit is claimed, under 35 U.S.C. §119(e)(1), to the filing date of U.S. provisional patent application Ser. No. 60/613,596, titled "APPARATUS AND METHOD FOR PAYLOAD ATTRIBUTION", filed on Sep. 27, 2004, and listing Herve Bronnimann, Nasir Memon and Kulesh Shanmugasundaram as the inventors, for any inventions disclosed in the manner provided by 35 U.S.C. §112, ¶1. That provisional application is expressly incorporated herein by reference. The scope of the present invention is not limited to any requirements of the specific embodiments described in that provisional application.

§1. BACKGROUND

§1.1 Field of the Invention

The present invention concerns network security. More specifically, the present invention concerns storing network traffic information for later analysis, and searching such stored information.

§1.2 Background Information

§1.2.1 The Need for Network Forensics

In networking, "attribution" is the problem of determining the source and/or the destination of some instance of traffic. For Internet Protocol ("IP") networks, this problem arises both at the level of individual packets and at the higher level of payloads. (Payload information may be contained in a single packet, or may span two or more packets.) At the level of packets, attribution of source is difficult because the source IP address can be spoofed. At the level of payloads, determining which source sent or received a particular sequence of data is difficult because of the lack of reliable logging mechanisms in networks. Attackers often use "zombie" or "stepping stone" hosts as intermediaries. Therefore, being able to attribute traffic to a particular source host is not a network security panacea. However, determining intermediates is useful because it brings us a step closer to the attacker, making it a valuable start in tracing attackers.

Several packet marking schemes have been proposed to meet the first hurdle (See, e.g., S. M. Bellovin, M. Leech, and T. Taylor, "ICMP traceback messages," *Internet Draft draft-ietf-itrace*-01.txt (*Work in progress*), IETF, October 2001, D. Dean, M. Franklin, and A. Stubblefield, "An algebraic approach to {IP} traceback," *Proceedings of NDSS*, February 2001, I. Hamadeh and G. Kesidis, "Packet marking for traceback of illegal content distribution," *Proceedings of International Conference on Cross-Media Service Delivery* (*CMSD*), Santorini, Greece, May 2003, I. Hamadeh and G. Kesidis, "Performance of ip address fragmentation strategies for ddos traceback," *Proceedings of IEEE IPCOM*, Kansas City, October 2003, S. Savage, D. Wetherall, A. Karlin, and T. Anderson, "Practical network support for IP traceback," *Proceedings of the* 2000 *ACM SIGCOMM Conference*, pages 295-306, Stockholm, Sweden, August 2000, D. Song and A. Perrig, "Advanced and authenticated marking schemes for IP traceback," *In IEEE Infocomm,* 2001.). These tools, however, require a set of network packets to do traceback and are not useful when one does not have the packets, but rather an excerpt of the payload only.

In order to meet this additional hurdle, tools have been developed that can record the entire network traffic and archive them for short periods of time (See, e.g., Infinistream at http://www.networkgeneral.com/, C. J. Antonelli, M. Undy, and P. Honeyman, "The packet vault: Secure storage of network data," Santa Clara, April 1999. *Proc. USENIX Workshop on Intrusion Detection and Network Monitoring*, Sandstorm Enterprises, NetIntercept at http://www.sandstorm.com, A. Mitchell and G. Vigna, "MNEMOSYNE: Designing and implementing network short-term memory," *International Conference on Engineering of Complex Computer Systems*, IEEE, December 2002.). However, since the means of cybercrimes are usually not known in advance, for example signature of a new worm, it would be useful to store the network traffic for weeks or even months so that one can go back in time to investigate earlier incidents. Unfortunately, recording raw network traffic not only makes it infeasible to archive the traffic for prolonged periods of time, but also raises serious privacy issues. These drawbacks limit the usefulness of these tools.

§1.2.2 Traceback Techniques and their Limitations

In A. C. Snoeren, C. Partridge, L. A. Sanchez, C. E. Jones, F. Tchakountio, S. T. Kent, and W. T. Strayer, "Hash-based IP traceback," *ACM SIGCOMM*, San Diego, Calif., USA, August 2001, Bloom filters have been used in a Source Path Isolation Engine ("SPIE") to trace IP packets over networks. SPIE creates hash-digests of packets and stores them in a router using Bloom filters. With wide deployment, SPIE can track a single packet to its source on the Internet. A SPIE-equipped router creates a packet digest for every packet it processes using the packet's non-mutable header fields and a prefix of the payload. These digests are then kept at the network component for a preset amount of time. When an attack is detected by a security component, such as a firewall or an intrusion detection system, it can present the offending packet to SPIE to trace the packet's path and the originator of a packet can be identified by launching enough queries along the packet's network path. With SPIE, any single packet can be traced back to its origin as long as all the nodes on the packet's path have not yet discarded the packet digest. Unfortunately, this makes the system unsuitable for forensics applications where information may be needed from a significantly distant past. Further, SPIE requires that a query present the whole packet, or at least the non-mutable headers and prefix of the payload, to do traceback. However, in most cases the exact packet that carried a certain payload might not be known.

More recently, Abhishek Kumar, Jun Xu, Jia Wang, Oliver Spatschek, and Li Li, "Space-code bloom filter for efficient per-flow traffic measurement," *Proceedings of IEEE INFOCOM*, Hong Kong, China, March 2004 proposes a novel technique, called Space Code Bloom Filters, for approximate measurement of traffic flows. Unlike previous measurement schemes, a novel Bloom filter based data structure, known as Space-Code Bloom Filter enables the method to track all traffic flows instead of just "heavy hitters."

Finally, S. Dharmapurikar, M. Attig, and J. Lockwood, "Design and implementation of a string matching system for network intrusion detection using FPGA-based bloom filters," *Technical Report*, CSE Dept, Washington University, 2004, Saint Louis, Mo. proposes using Bloom filters for intrusion detection by matching known signatures to the payload. The problem that they tackle, often referred to as deep packet inspection, involves detection of predefined signature strings or keywords starting at an arbitrary location in the payload. The Bloom filter contains the signatures and is used for intrusion detection, not forensics with respect a past security breach. Hence archiving and storing the Bloom filters is not a concern for them. Rather, their challenge is performing their query at line speed over all possible alignments and various block lengths.

Over the past few years extensive research has been done in developing feasible solutions to trace back network traffic to its source on the Internet. Traceback systems can generally be grouped into three broad categories: (1) Traceback of single packets (e.g. SPIE); (2) Traceback of network floods; and (3) Traceback of connection chains. SPIE was introduced above. We now briefly summarize work in the other two areas below.

Distributed denial of service attacks create large uncorrelated network flows towards a particular host or a set of hosts. Since source IP addresses are usually spoofed, the traceback of the attack to its source a non-trivial task. Researchers have proposed some clever solutions to the problem of tracing IP packets back to their source (IP traceback). Most of this work can be grouped into two main categories: one in which no extra network packets are generated (See, e.g., H. Burch and B. Cheswick, "Tracing anonymous packets to their approximate source," *Proc. USENIX LISA*, December 2000, D. Dean, M. Franklin, and A. Stubblefield, "An algebraic approach to {IP} traceback," *Proceedings of NDSS*, February 2001, S. Savage, D. Wetherall, A. Karlin, and T. Anderson, "Practical network support for IP traceback," *Proceedings of the 2000 ACM SIGCOMM Conference*, pages 295-306, Stockholm, Sweden, August 2000, A. C. Snoeren, C. Partridge, L. A. Sanchez, C. E. Jones, F. Tchakountio, S. T. Kent, and W. T. Strayer, "Hash-based IP traceback," *ACM SIGCOMM*, San Diego, Calif., USA, August 2001, D. Song and A. Perrig, "Advanced and authenticated marking schemes for IP traceback," *IEEE Infocomm*, 2001.), and the other in which a few extra network packets are generated (See, e.g., S. M. Bellovin, M. Leech, and T. Taylor, "ICMP traceback messages," *Internet Draft draft-ietf-itrace-01.txt* (*Work in progress*), IETF, October 2001, A. Mankin, D. Massey, C. L. Wu, S. F. Wu, and L. Zhang, "On design and evaluation of 'intention-driven' ICMP traceback," *Proc. IEEE International Conference on Computer Communications and Networks*, October 2001.). These mechanisms, however, are not effective against attacks that require a relatively smaller amount of packets. An encoding strategy proposed in I. Hamadeh and G. Kesidis, "Packet marking for traceback of illegal content distribution," *Proceedings of International Conference on Cross-Media Service Delivery* (*CMSD*), Santorini, Greece, May 2003, I. Hamadeh and G. Kesidis, "Performance of ip address fragmentation strategies for ddos traceback," *Proceedings of IEEE IPCOM*, Kansas City, October 2003 requires that border routers establish a trusted region and encode the router's IP in all egress traffic. A destination host can then decode the IP address of the closet border router to source of a packet from the IP fragment-id field. None of these methods can be used against malicious network events that can only be defined by a packet's payload, like for example, uploading a company's confidential information to a public FTP site.

A related problem, at a different level of abstraction however, is tracing connection chains. Attackers often obscure their identity and location by forming a connection chain by logging into a set of compromised systems ("stepping stones") before attacking a target. Tracing the attack from the victim takes us only to the last link in the chain but not to the location of the attacker. Methods are proposed to trace intruders through stepping-stones. The method proposed in S. Staniford-Chen and L. T. Heberlein, "Holding intruders accountable on the internet," *Proceedings of the* 1995 *IEEE Symposium on Security and Privacy*, Oakland, 1995, creates "thumb-prints" of connections using packet content which can be compared to determine whether two connections contain the same text and are therefore likely to be part of the same connection chain. However, the method fails when the connections are encrypted. To address the problem Y. Zhang and V. Paxson, "Detecting stepping stones," *Proceedings of the 9th USENIX Security Symposium*, Denver, Colo., USA, August 2000 proposes an algorithm that doesn't rely on traffic content, instead relies on packet sizes, packet intervals, etc. to identify stepping stones.

§2. SUMMARY OF THE INVENTION

Given a payload (or a significant portion of payload henceforth referred to as an excerpt) and a time interval, the senders and/or the receivers of the payload can be identified. This process is called payload attribution. Whereas payload attribution may not be useful with flooding-like attacks, where the packets can be empty or always the same, it is very useful when incidents cannot be characterized by superficial features such as packet headers, packet rate, or a fixed length prefix of the payload. For example, with viruses, worms, and vulnerability exploits, it is often difficult to distinguish a benign packet from a malicious one by simply logging and analyzing such superficial features. A worm exploiting a remote vulnerability in a web server, for instance, would send a request to port 80 much like any legitimate web browser. By the time the worm's signature becomes available to Intrusion Detection Systems, the worm may have already infected most of the network. In this scenario, a payload attribution system can help one identify hosts that received the worm and hosts that propagated the worm. This information can be useful for a network administrator to quarantine or clean-up infected hosts.

The present invention may be used to help identify hosts that received and/or propagated certain information (e.g., a worm, stolen information, etc.). The present invention may do so by providing a compact, hash-based, payload digesting data structure. A simple payload attribution system consistent with the present invention may utilize hierarchical Bloom filters ("HBFs") to compactly store payload digests and can attributing excerpts of payloads. Note that unlike previous schemes, the proposed attribution system does not require an entire packet for attribution but only a reasonably long excerpt (for example, 128 bytes) of a packet's payload. Compared to recording raw network traffic, the proposed solution has lesser storage requirements and provides better privacy guarantees.

An exemplary system consistent with the present invention, using HBF, is implemented in software. It performs very well on a moderate-speed network (intranets, medium-bandwidth links). It monitors network traffic, creates hash-based digests of payload, and archives them periodically.

A query mechanism provides the interface to answer post-mortem questions about the payload.

The accuracy of attribution increases with the length of the excerpt and specificity of the query. While the error rates of the individual Bloom filters are fairly high, combined together in a hierarchical structure consistent with the present invention achieves low overall false positive rates. With the proper extension, the solution is effective even if the excerpt spans several packets: it will be detected with the same low false positive rate.

Embodiments consistent with the present invention are robust against packet transformations that don't manipulate payloads, such as packet encapsulation, fragmentation, or re-packetization. The query string known to the analyst may also appear in the payload in a compressed or encoded form. If the transformation is known (e.g., base64, uuencode, gzip, or encryption with known key), then the excerpt may be transformed appropriately to query the system. The low false positive rate ensures that if there is a match, it is very likely the excerpt has been transmitted under that form.

§4. DETAILED DESCRIPTION OF THE INVENTION

The present invention may involve novel methods, apparatus, message formats, and/or data structures for storing and searching for information found in payloads of packets of a network flows. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

For the sake of brevity, unless specified otherwise, we use the term "payload information" or "flow content", or more briefly "payload", when we actually mean some arbitrary excerpt from the payload(s). Such an excerpt may be in the payload of a single packet, or may span the payloads of two or more packets.

§4.1 Overview

Figure 1:
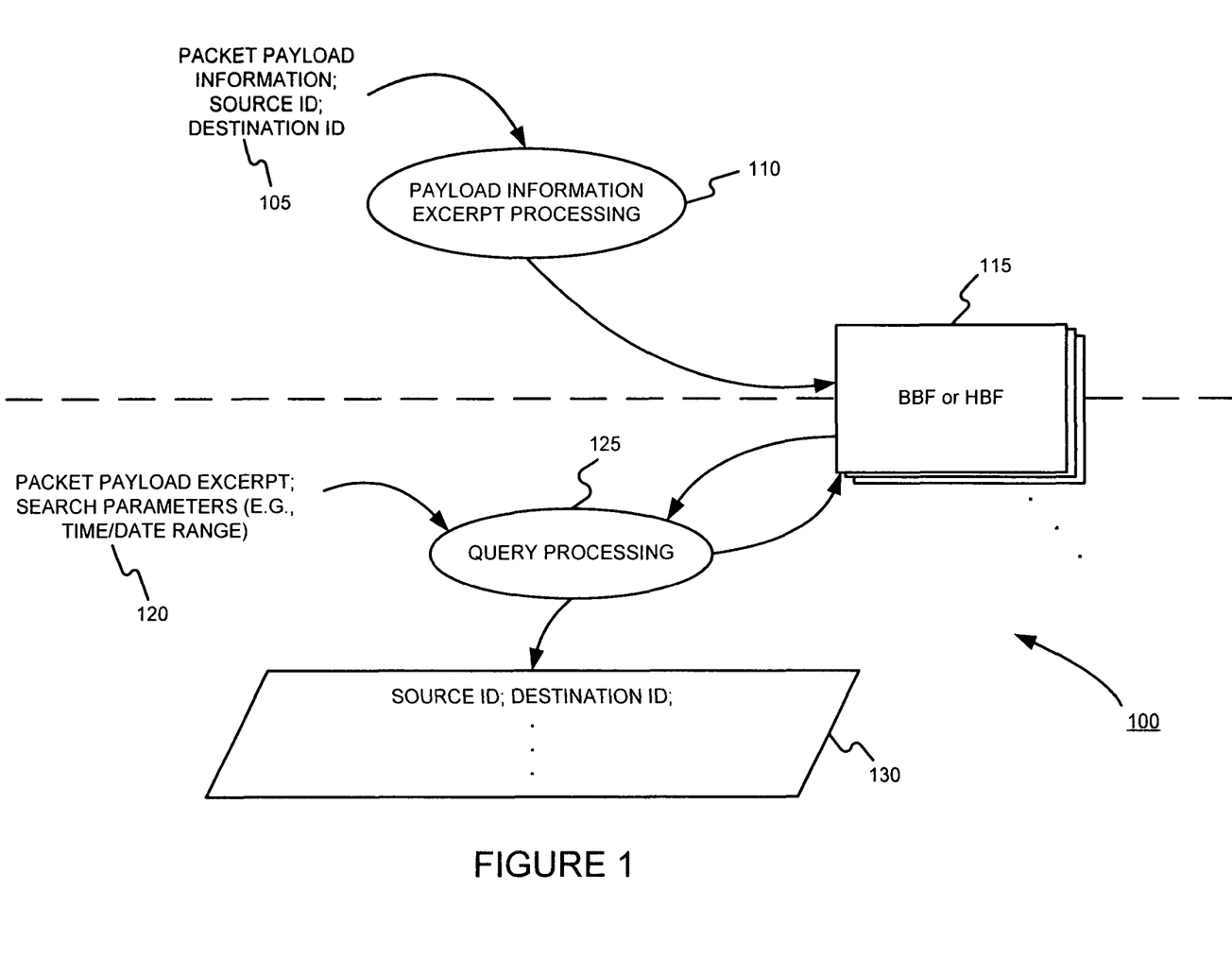
FIG. 1 is a bubble diagram illustrating operations that may be performed in an embodiment consistent with the present invention, as well as information that may be generated and/or used by such operations.

FIG. 1 is a bubble diagram illustrating operations that may be performed in an embodiment consistent with the present invention, as well as information that may be generated and/or used by such operations. Specifically, the bubble diagram illustrates operations that may be performed for attribution of an excerpt of packet payload information.

The system may include payload information excerpt processing operations 110, as well as query processing operations 125. The payload information excerpt processing operations 110 may obtain packet payload information and other associated information (e.g., source ID and destination ID), and generate packet payload information excerpts. The packet payload excerpts may be hashed appropriately and therefore compactly stored utilizing Block-Based Bloom Filters (BBF), or preferably Hierarchical Bloom Filters (HBF) 115. The information stored in the BBFs and HBFs 115 may also be available to the query processing operations 125.

The query processing operations 125 may accept packet payload excerpts along with other search parameters (e.g., time/date range) (generally queries 120) in order to examine if the packet payload excerpt has been seen by the system in the BBFs or HBFs. Hence, the query processing operations 125 searches for a match between the query and stored payload excerpts present in the BBFs or HBFs 115. If a match is found in the BBF or HBF 115, the system may then obtain host ID information associated with the matching payload excerpt. Subsequently, the host ID information 130 may be presented to the query requester. The host ID information 130 may include source ID and destination ID information as well as other information (e.g., source port, destination port, etc).

Figure 2:
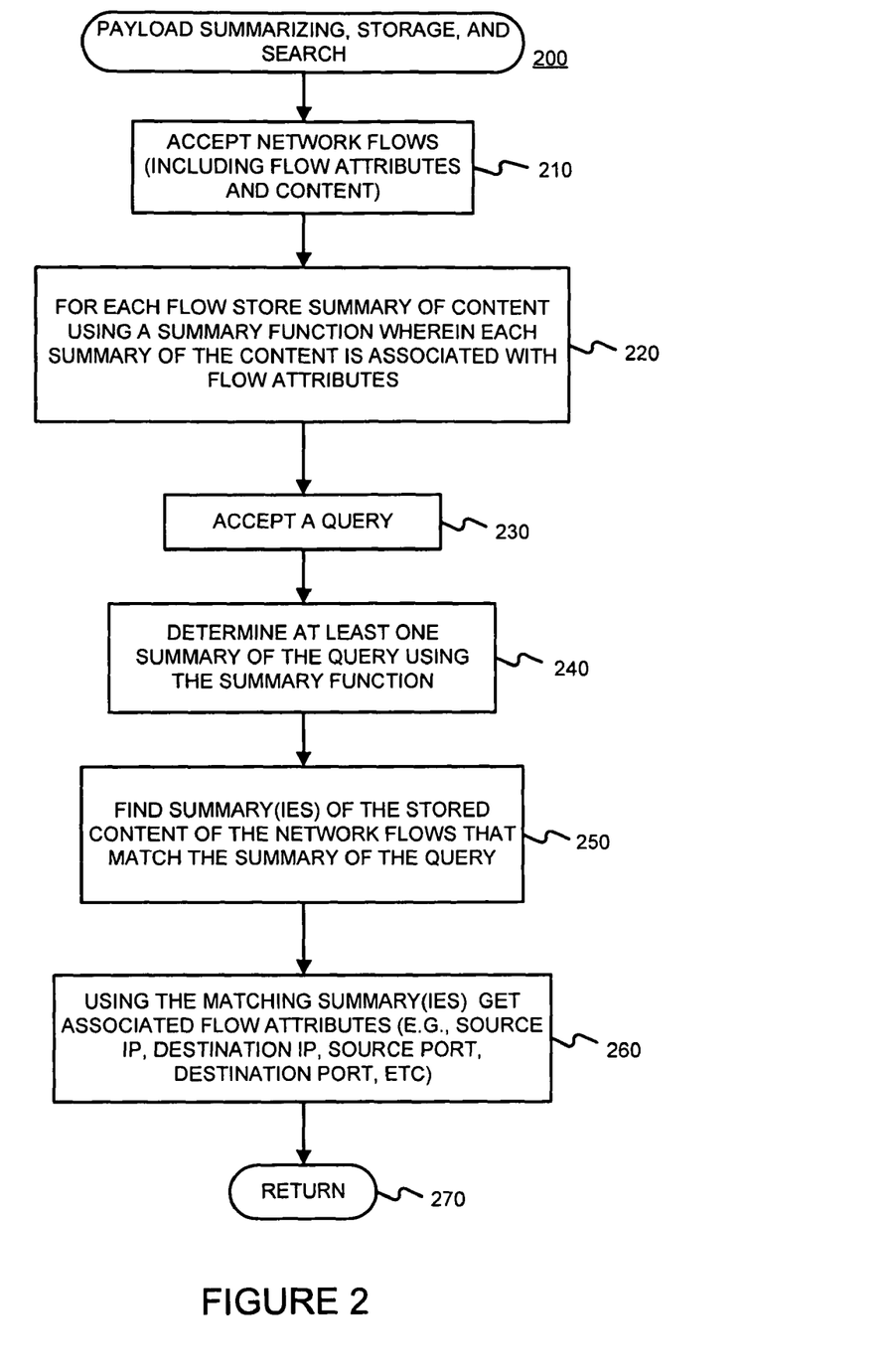
FIG. 2 is a flow diagram illustrating an exemplary method for searching, summarizing and storing payloads in a manner consistent with the present invention.

FIG. 2 is a flow diagram illustrating an exemplary method 200 for summarizing, storing and searching payload excerpts in a manner consistent with the present invention. Specifically, the method 200 may accept network flows (including flow attributes and content). (Block 210) Subsequently, the method 200 may, for each flow, store a summary of content of the flows determined using a summary function wherein each summary of the content is associated with flow attributes. (Block 220)

Later, the method 200 may accept a query from a requester. (Block 230) Upon the reception of a query request, the method 200 may first proceed to determine at least one summary of the query using the summary function. (Block 240) Afterwards, the method 200 may proceed to find a summary (ies) of the stored content of the network flows that match the summary of the query. (Block 250) Finally, using the matching summaries, the method 200 may get the associated flow attributes (e.g., source IP, destination IP, source port, destination port, etc.). (Block 260)

Referring back to block 220, the summarizing function may be a hash which hashes accepted network flow along with its associated flow attributes. Hence, the system need not store whole network flows which would result in the need for large memory use for raw data storage. Instead, the system may store hashes or summaries of network flows which saves a great deal of memory. Further, for every hash, the method 200 includes associated flow attributes. Therefore, network arbitration is still possible even with hashed/summarized network flows.

Referring back to blocks 250 and 260, given a summary/hash of a query, the method 200 may determine a summary (ies) of stored content of network flows that match the provided query. Further, by finding a match, the method 200 may also provide the associated flow attributes (e.g., source IP, destination IP, source port, destination port, etc.) of the match.

Thus, for example, provided a summary of a virus payload, it is possible for the system to determine whether it has been seen in the network as well as determine its payload attributes if seen (source IP, destination IP, etc).

§4.2 Exemplary Data Structures

§4.2.1 The need to Digest or Summarize Flow Information

As discussed above, it would be useful to store the network traffic for weeks or even months so that one can go back in time to investigate earlier incidents. This should be done in a way that reduces storage requirements. The storage of such data should avoid raising privacy concerns.

§4.2.2 Bloom Filters

Ever since Bloom filters were introduced by Burton Bloom in B. Bloom, "Space/time tradeoffs in hash coding with allowable errors," *CACM*, pages 422-426, 1970 they have been used in a variety of contexts (See, e.g., Eugene H. Spafford, "OPUS: Preventing weak password choices," *Computers \& Security*, pages 273-278, May 1992.).

A Bloom filter is a simple, space-efficient, randomized data structure for representing a set in order to support membership queries. It uses a set of k hash functions of range m and a bit vector of length m. Initially, the bit vector is set to 0. An element in the set is inserted into the Bloom filter by hashing the element using the k hash functions and setting the corresponding bits in the bit vector to 1.

To test whether an element was inserted into the filter, we simply hash the element with the same hash functions and if all corresponding bits are set to 1 then the element is said to be present in the filter.

The space efficiency of a Bloom filter is achieved at the cost of a small probability of false positives as defined by Equation 1, where n is the number of elements in the set.

$$FP = \left(1 - \left(1 - \frac{1}{m}\right)^{kn}\right)_k \approx (1 - e^{-kn/m})^k. \quad (1)$$

§4.2.3 Block-Based Bloom Filters (BBFs)

In order to extend support for attributions based on excerpts, embodiments consistent with the present invention may block the payload of each packet into a set of blocks of size s. Each block is then appended its offset in the payload: (content||offset), where content is the block content, $0 \leq \text{offset} \leq q = [p/s]$, and p is the size of the entire payload. It is then hashed and inserted into a standard Bloom filter. Such a data structure may be referred to as a block-based Bloom filter (BBF) with offsets. See FIGS. 5(a) and 5(b) which illustrate (a) Inserting the string "ABRACADABRACABARACAB A . . . " into a BBF with s=3, and (b) Querying with "BRACADAB": the various blocks and offset combinations. Each line corresponds to an alignment, the faint letters do not get certified by the BBF; hence each alignment only gives two blocks to check. An X marks a mismatch of a block, and a Y marks a match; in case the first block is a match, the second block is tested, and so on. The YY in line 2, offset 1, is a real match. On the last line, the YY in offset 2 is a double false positive of the BBF, in offset 3 is a real match (both blocks), and in offset 5, the YX means the first block is a match but the second isn't, hence the combination isn't a match.

Figure 5:
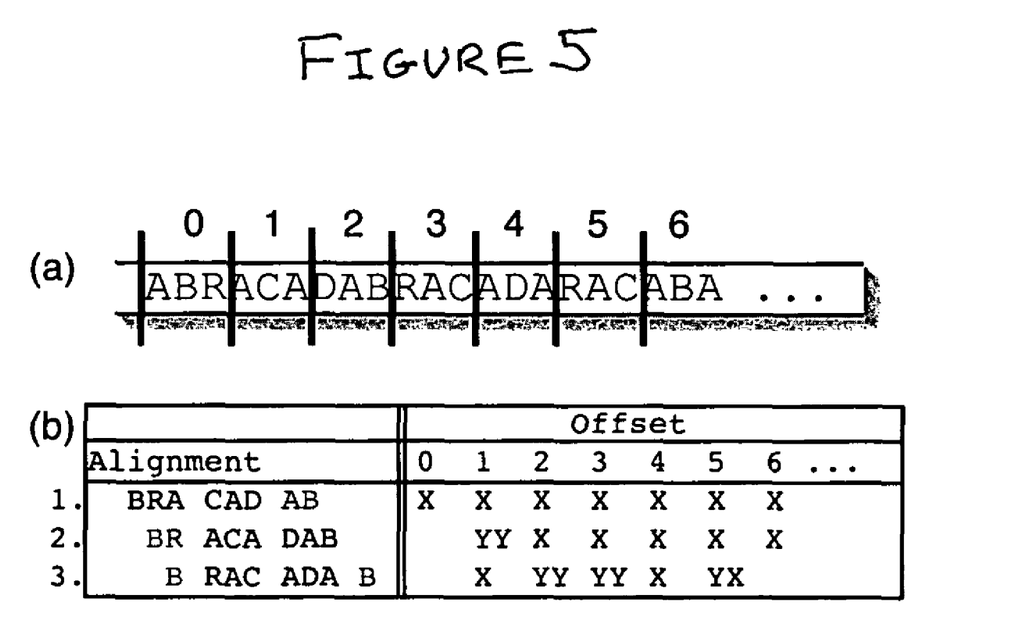
FIGS. 5a and 5b illustrate the processing of a string by a block-based Bloom filter.

Given an excerpt x, a query proceeds as follows: since the excerpt may not start exactly on a block boundary, queries should try all possible offsets (based on maximum packet size) with all possible first blocks (at most s-1) of the excerpt. To do this, embodiments consistent with the present invention may slide a window of size s through x and find matching block with confidence level FP as determined by Equation 1, where n is the number of blocks stored in the BBF. As soon as a match is found for the first block, the query can proceed with the next block at the next offset until all blocks are matched. It is also easy to extend the search over multiple packets. In the event that the excerpt x spans multiple packets, all the prefixes of each block should be checked; if a prefix of a block is found in the packet, then the query proceeds with the next block starting exactly where the prefix left off, at the offset 0. A possible query is depicted in FIG. 5(*b*). For each packet of length p, a BBF method requires $(m/n) \times [p/s]$ bits as oppose to only $(m/n)$ bits required by the standard Bloom filter. At the cost of extra storage, a BBF allows the granularity of excerpt attribution to be fine tuned by way of the block size in the queries. For example, decreasing the block size s increases the amount of space required but provides better support to excerpt queries by reducing the granularity of the block. Unlike the standard Bloom Filter, a BBF uses $[q/s] \times (\text{lof f set}-[q/s])$ queries, where lof f set is the largest of f set in the BBF and q is the length of the excerpt.

Note that if blocks of a given string occur in different packets at the appropriate offsets (an event referred to as offset collision), this method will see the set of substrings as if the whole string had occurred together in a single packet even if it did not. For example, for two packets made of blocks $S_0S_1S_2S_3S_4$ and $S_0S_2S_3S_1S_4$ (note the reordering), BBF would identify the string "$S_2S_1$" as if it occurred in a single packet when in fact it did not. This ambiguity is a result of inserting string $(S_2||2)$ from packet (a) and string $(S_1||3)$ from packet (b) into the BBF. The BBF could not recognize the fact that the strings in fact occurred in two different packets. For a BBF to work over multiple packets a unique packet identifier may be associated with each substring (content||offset||packetID). This, however, severely increases the number of queries required for attribution as it is not known a priori which packet contains the query string.

It may be useful to maintain up to three Bloom filters to answer queries—one for (content), one for (content||offset), and one for (content||offset||packetID). Next, a simple technique that decreases the false positive rate due to collisions and fuses all three Bloom filters into one is described.

§4.2.4 Hierarchical Bloom Filters (HBFs)

In this section, a data structure referred to as a Hierarchical Bloom Filter (HBF), which can be used for payload attribution, is introduced. Payload attribution system consistent with the present invention may use an HBF.

A payload attribution system that consumes a small amount of storage and also provides some privacy guarantees may simply store hashes of payloads instead of the actual payloads. This effectively reduces the amount of data to be stored per packet to about 20 bytes (using SHA1, for example). Using a standard Bloom filter, k hash functions, this space can be further reduced at the cost of a small false positive rate as defined by Equation 1. For a specific space usage of m bits, n strings (packets) inserted into the Bloom filter, the optimum value for FP is achieved for k=ln 2 (m/n) and $FP \approx 0.6185^{m/n}$. So, for example, storage per packet can be reduced from 20 bytes to 21 bits at a false positive rate of $4.27 \times 10^{-5}$. Compared to simple hashes, an advantage of using standard Bloom filters is the space saving.

Unfortunately the approaches described above restrict the queries to the whole payload. Attributing excerpts of payload is more useful and a simple approach to support queries on excerpts is to hash blocks of the payload instead. Indeed such a data structure is described below. Two issues arise however. First, if the chosen block size is too small too many collisions may occur as there are not enough unique patterns, yet for too large a block size, there isn't enough granularity to answer queries smaller than a payload. Second, one needs a mechanism to determine when two blocks appear consecutively in the same payload, or if their presence is merely an artifact of the blocking mechanism. A data structure that resolves these two issues simultaneously is described below.

Figure 6:
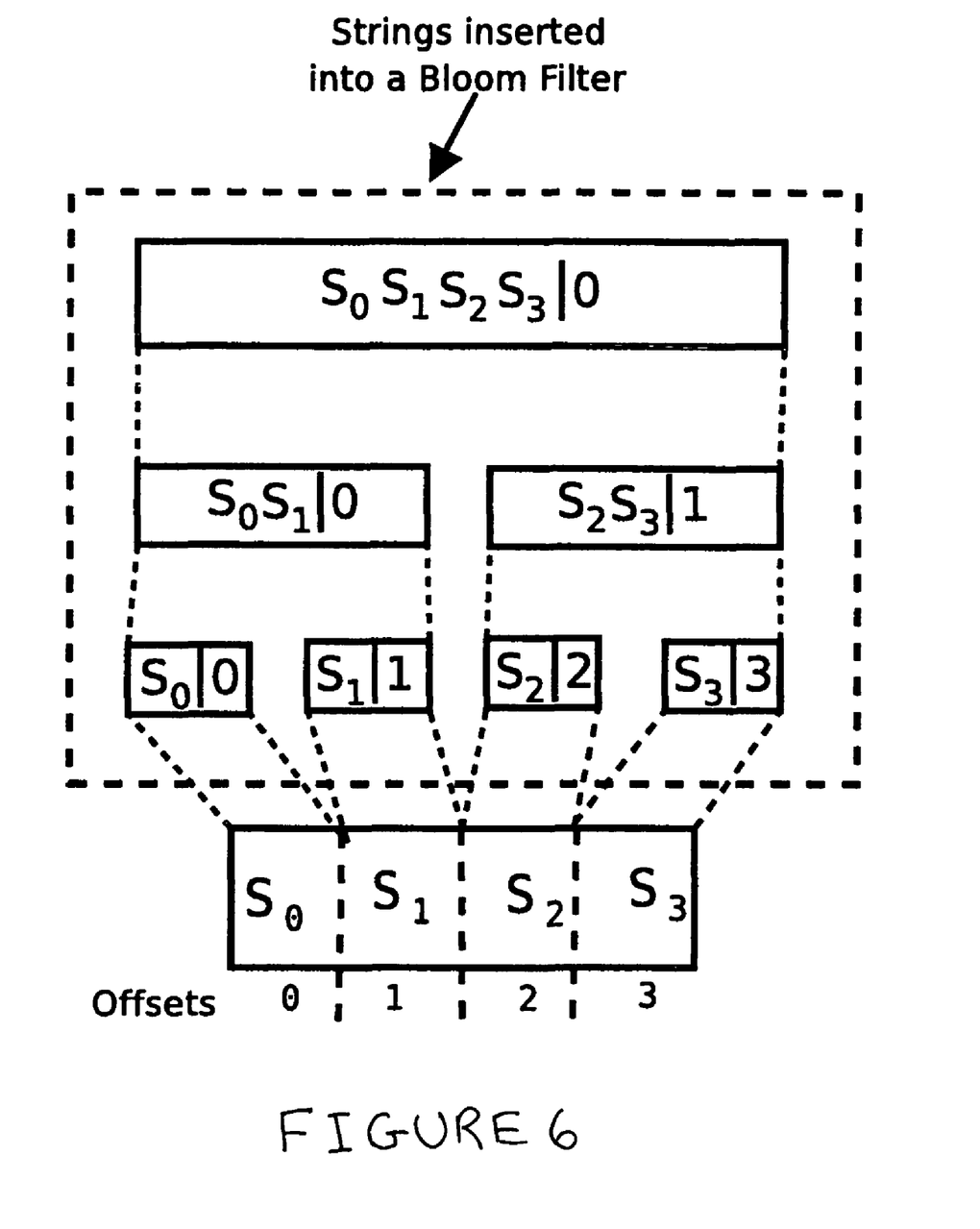
FIG. 6 illustrates inserting a string into a hierarchical Bloom filter.

A Hierarchical Bloom filter (HBF) is simply a collection of BBFs for (e.g., geometrically) increasing block sizes. For instance, we may choose powers of two times the block size, though the invention is not limited to such an implementation. A string is inserted into the hierarchy from bottom-up. A string of length p is broken into [p/s] blocks which are inserted into the HBF at level 0. At the next level, two subsequent blocks are concatenated and inserted into the HBF at level 1 and so on. FIG. 6 illustrates a simple example of such a hierarchy. In this example, string "$S_0S_1S_2S_3$" is blocked into blocks of size (s=1) at the bottom of the hierarchy. Then "$S_0S_1$" and "$S_2S_3$" are inserted at level 1, and "$S_0S_1S_2S_3$" at level 2. Thus, even if substrings have occurred at the appropriate offsets, going one level up in the hierarchy allows verification of whether the substrings occurred together in the same or different packets.

Aggregating results from multiple queries within a particular level and from the levels above in the hierarchy can improve the confidence of the result and reduce the impact of collisions. Verifying an excerpt of length q on an HBF uses $\Sigma([q/s^i] \times (\text{lof f set}/2^i - [q/s^i]))$ queries where lof f set is the largest of f set in the HBF and i is the level at which the excerpt is being evaluated hence $0 \leq i \leq \log[q/s]$.

Note, however, that not all strings may be of exact length to fit in the hierarchy. For example, with d levels in the hierarchy, if $(p \gg (s \times 2^d))$ we may not be able to store the entire string in the hierarchy as it is not deep enough. On the other hand, if for many packets $(p \ll (s \times 2^d))$ then Bloom filters higher in the hierarchy will be underutilized. Implementing the hierarchy using a single Bloom filter with the offset of each element concatenated to it during insertion, like (content||offset), improves the space utilization. For example, in order to store string "$S_0S_1S_2S_3$" in the hierarchy, the following strings are inserted into the Bloom filter $\{(S_0S_1S_2S_3\|0), (S_0S_1\|0), (S_2S_3\|1), (S_0\|0), (S_1\|1)(S_2\|2), (S_3\mu 3)\}$ determine the optimal number of elements inserted into it a priori.

It is clear that HBF allows excerpt queries to be processed with a higher accuracy than a BBF. Note that HBF does not rely on a packet identifier to resolve the offset collisions.

The hierarchical nature of the HBF resolves collisions automatically. Furthermore, HBFs can also do limited pattern matching. For example, suppose one would like to verify if they have actually seen a string of the form "$S_0S_1*S_3$". As in BBF, the string is broken down into three individual query strings $\{S_0, S_1, S_3\}$. By trying all possible offsets at the bottom of the hierarchy, one can verify the existence of strings $\{(S_0\|i), (S_0\|i+1), (S_3\|i+3)\}$ with false positive rate FP. Since '$S_0$' and '$S_1$' are subsequent in the query string we can improve the confidence of the results by verifying query string $(S_0S_1\|i)$ at the level above. Now if one can make intelligent guesses for '*' and when a match $S_x$ is found, one can verify the match at different levels of the hierarchy. For example, one can verify the whole string "$S_0S_1S_xS_3$" all the way to the top of the hierarchy consequently improving the confidence of the result at each level.

§4.3 Payload Except Processing
§4.3.1 Exemplary Methods

Figure 3:
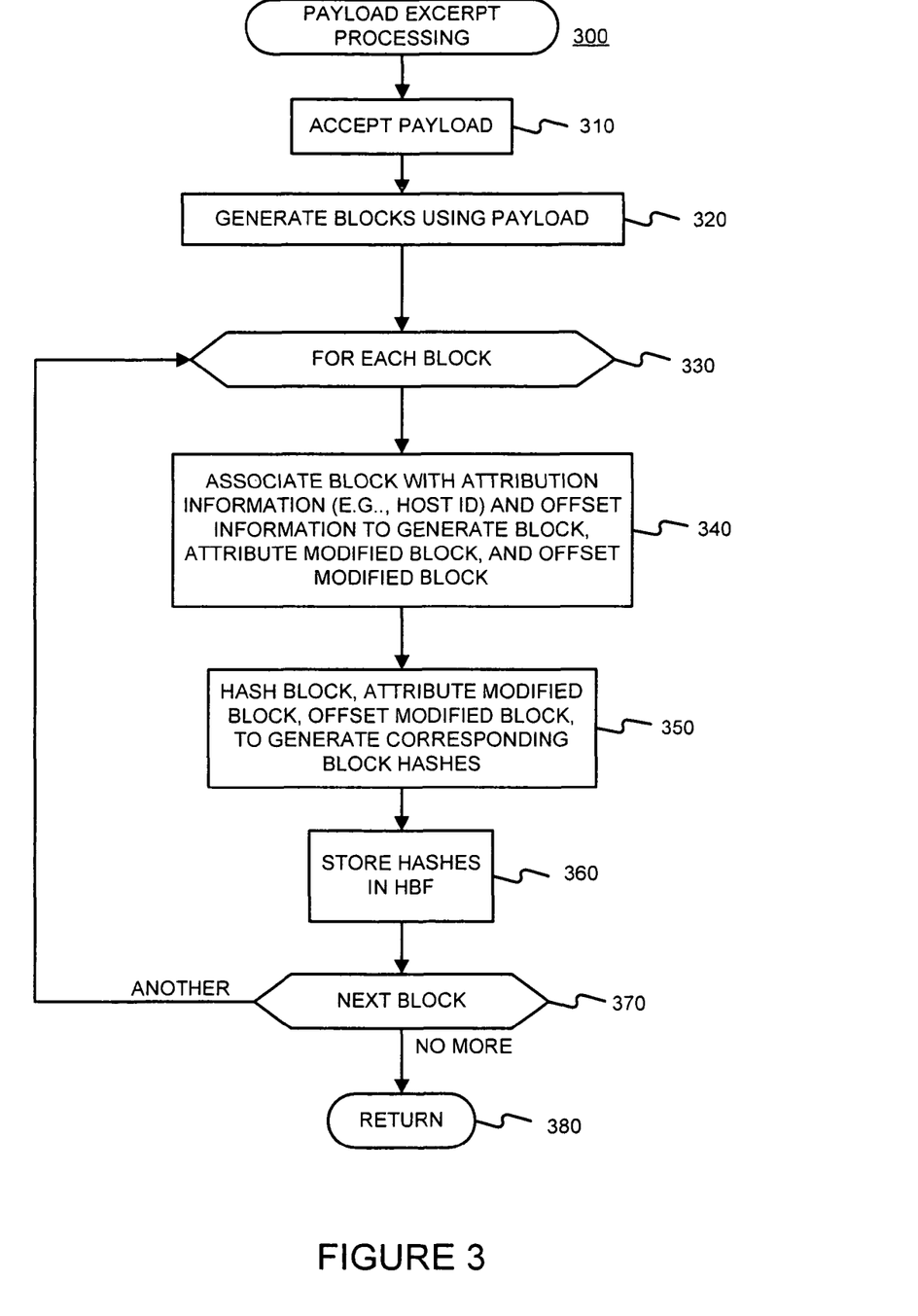
FIG. 3 is a flow diagram illustrating an exemplary method for processing payload information in a manner consistent with the present invention.

FIG. 3 is a flow diagram illustrating an exemplary method 300 for processing payload excerpts in a manner consistent with the present invention. In particular, the method 300 may accept a payload and generate blocks from it. (310 and 320) Subsequently, for each of the generated blocks (330-370), the method 300 may associate each block with attribute information (e.g., host ID) and offset information to generate a block, an attribute modified block, and an offset modified block. (340) Then, the method 300 may proceed to hash the block, the attribute modified block, and offset modified block to generate corresponding block hashes. (350) Finally, the method 300 may store the hashes in the HBF. (360) The method 300 may seek to proceed with the above mentioned process for each block of a given payload (330-370) before it is left (380).

§4.3.2 SIMPLE EXAMPLE ILLUSTRATING OPERATIONS PERFORMED BY AN EXEMPLARY EMBODIMENT CONSISTENT WITH THE PRESENT INVENTION

Figure 9:
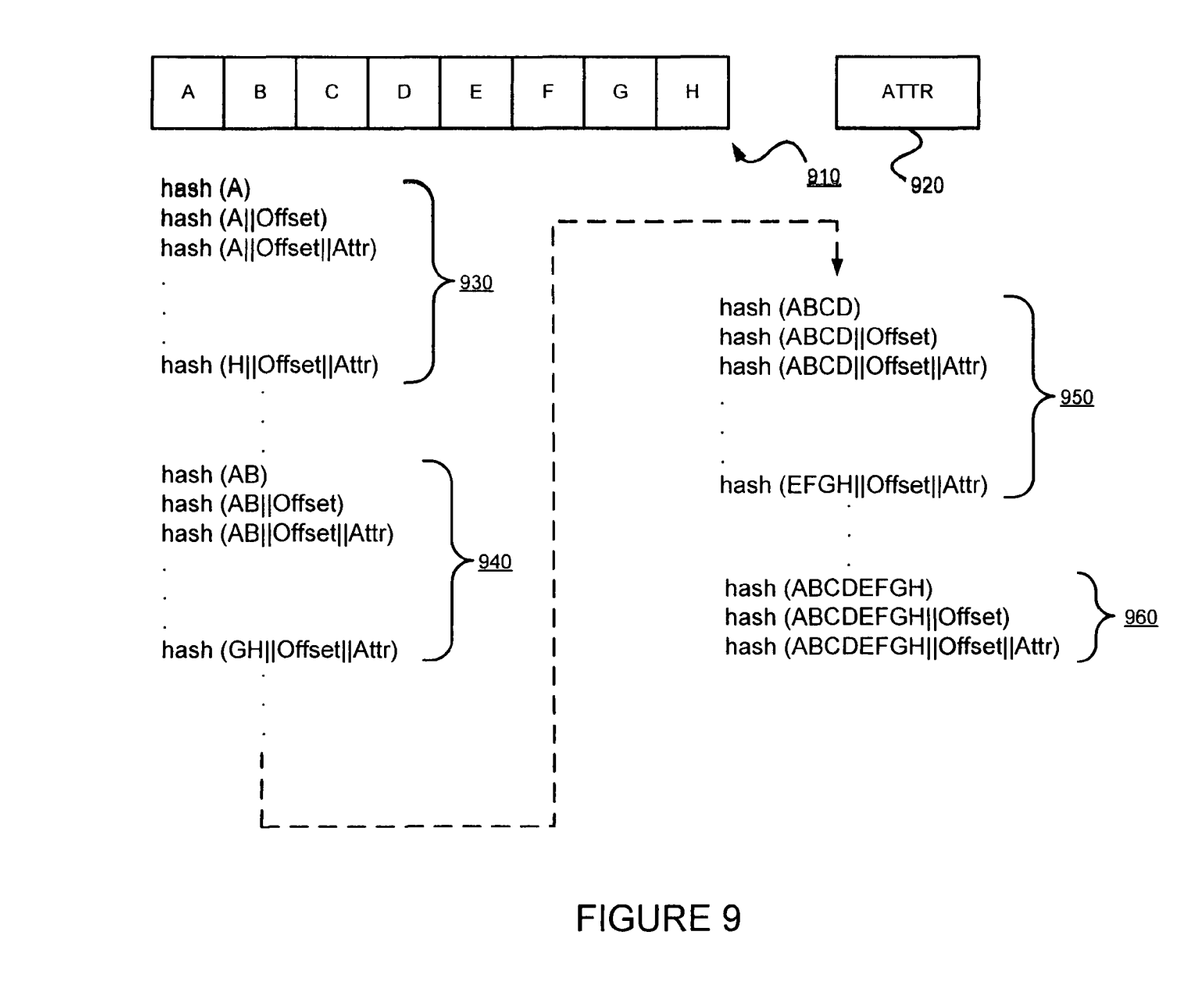
FIG. 9 is an example illustrating processing a string for insertion into a hierarchical Bloom filter.

FIG. 9 illustrates an example of how payload information 910 may be hashed in a manner consistent with the present invention. Specifically, assume payload information 910 is associated with (e.g., flow) attribute information 920. The attribute information 920 may include information such as source IP address, destination IP address, source port, destination port, and the payload information may include content represented by units A through H. The system may process payload information 910 by taking different block sizes. First, the system may applying a block size of a single unit and go though all units of the packet payload (A through H). Note that the system is hashing (1) the blocks, (2) the blocks with an offset, and (3) the blocks with the offset and the attribute information 930. Next the system may increase the block size to two units which results in the hashing of blocks AB, CD, EF, and GH, as well as the blocks with their offsets and corresponding attribute information 940. Next the system may increase the block size to four units—blocks ABCD, EFGH—and hash the blocks, as well as the blocks with their offsets and corresponding attribute information 950. This process continues in a like manner such that the system may reach a block size of the length of the packet payload 910. Therefore, the final hash will be ABCDEFGH along with the offset and its attributes 960. Although the blocks were non-overlapping in this example, this is not a requirement. Also, although the block sizes increased by a power of 2, in this example, this is not a requirement.

§4.4 Query Processing
§4.4.1 Exemplary Methods

Figure 4:
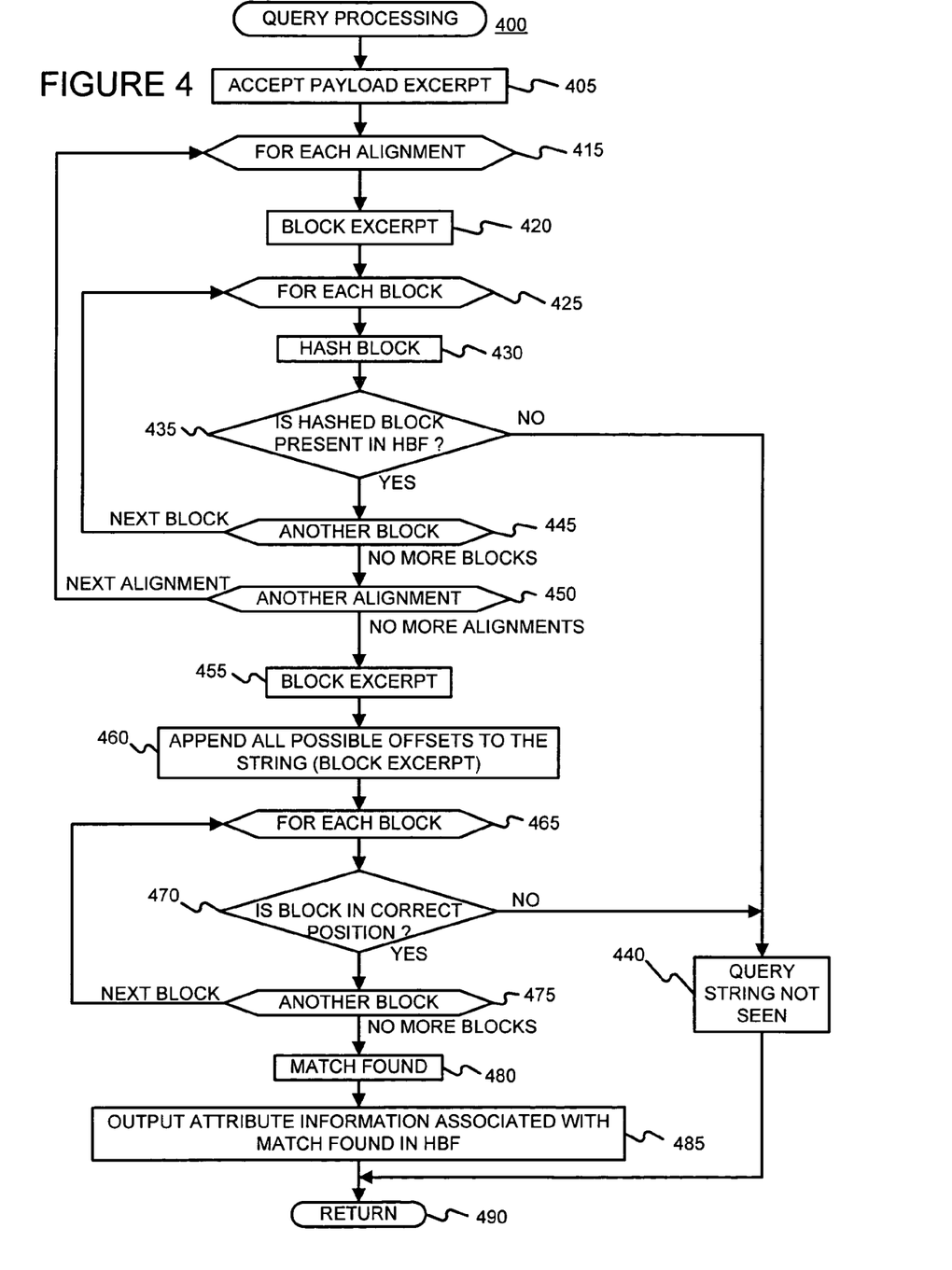
FIG. 4 is a flow diagram illustrating an exemplary method for processing queries in a manner consistent with the present invention.

FIG. 4 is a flow diagram illustrating an exemplary method 400 for processing queries in a manner consistent with the present invention. In particular, the method 400 may accept a payload excerpt as a query. (405) Then, for each possible alignment/window size and offset (415-450), a block excerpt is formulated. (415 and 420) Further, for each of the block excerpts (425-445) a hash block is formulated (430) and the method 400 may examine if the hash block is present in an HBF. (435) If the hashed block is not present in an HBF, then the query string has not been seen by the system and the method 400 may terminate further processing for the particular query. (440 and 485) If, on the other hand, the hashed block is present in an HBF, the method 400 may proceed to examine the rest of the blocks if available. (425-445) If all the blocks have been examined, the method 400 may proceed to process another alignment if available. (415-450)

Once the blocks have been verified by the method 400, a second phase of verifying the order of the blocks is performed. Therefore, the method 400 may further examine the block excerpt. Given the block excerpt, the method 400 may append all possible offsets to the string (block excerpt). (455 and 460) Subsequently, for each block (465-475), the method 400 may examine if the block is in the correct position. (470) If a block is not in a correct position, then the query string has not been seen by the system even though the blocks were verified earlier in the query processing. (440) If a block is in a correct position, the method 400 may proceed to verify a next block if available (465-475) until all the blocks are verified in their correct positions. (475) Once all the block positions are verified, then the method 400 has found a match. (480) Attribution information associated with the matching block(s) may be provided as an output (485) before the method 400 is left (490).

§4.4.2 SIMPLE EXAMPLE ILLUSTRATING OPERATIONS PERFORMED BY AN EXEMPLARY EMBODIMENT CONSISTENT WITH THE PRESENT INVENTION

Figure 10:
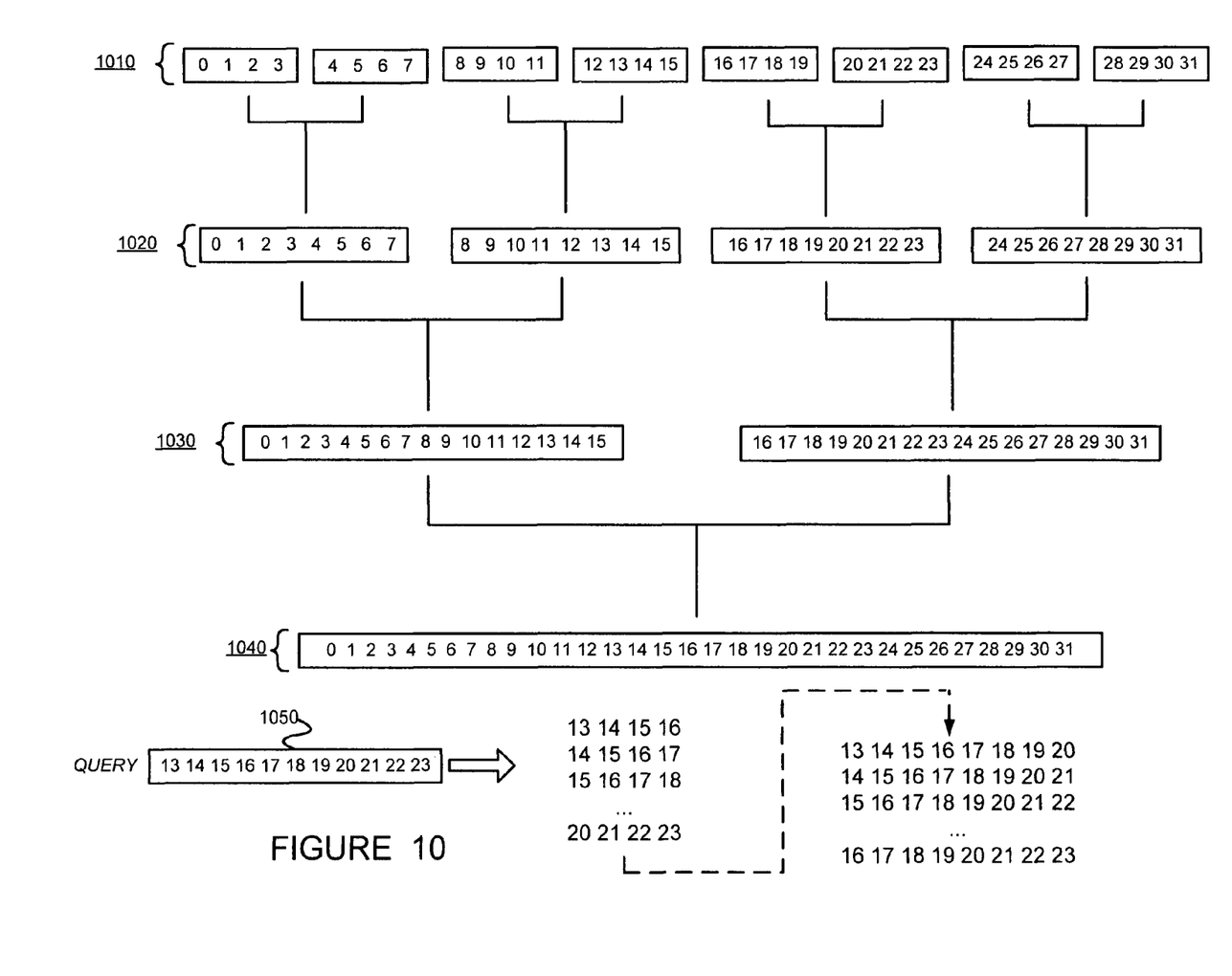
FIG. 10 is an example illustrating searching for a query string in a hierarchical Bloom filter.

FIG. 10 illustrates an example of how a query may be processed in a manner consistent with the present invention. In particular, assume a query 1050 received by the system in order to examine if it has been seen in an HBF. Further assume an HBF contains hashes 1010-1040 in a hierarchical manner of a packet payload. The system may proceed by segmenting the query into various block sizes, applying all possible alignments, and hashing these blocks. For instance, as seen in FIG. 10, taking a block size of four units and all possible alignments provides the following hashes {13 14 15 16}, {14 15 16 17}, . . . {20 21 22 23}. Examining the first hierarchy 1010, it is clear that matches exists for hashes {16 17 18 19} and {20 21 22 23} of the query. Now that matches have been found the system may increase the confidence of a correct match by examining another level in the hierarchy. By taking a block size of eight units and all possible alignments of the query 1050, the system provides the following hashes {13 14 15 16 17 18 19 20}, {14 15 16 17 18 19 20 21}, . . . {16 17 18 19 20 21 22 23}. Examining the second hierarchy 1020, it is clear that a match exists here as well for hash {16 17 18 19 20 21 22 23} which is a large part of the query payload. It is now clear with a high degree of confidence that the query 1050 has been seen by the system. Although not shown, an HBF with offsets may be searched by applying block offsets. Although not shown, an HBF with attribute information may be searched by applying attribute information to the query blocks. Such attribute information may be attributes of flows that occurred during a desired (as expressed by a query) time range, and/or date range.

§4.5 Exemplary Apparatus

An exemplary payload attribution system ("PAS") consistent with the present invention is now described. Note that the construction of an HBF described above can only verify whether a string queried was seen by the HBF or not. However, if one would like to attribute an excerpt to a host then payloads must be associated with a particular host (or a pair of hosts). This may be accomplished by inserting an additional substring of the form (content||offset||hostID) for each block inserted into HBF, where hostID could be a string that identifies the host that originated or received the payload. For most practical purposes, hostID can simply be (SourceIP, DestinationIP). During attribution, if the source and destination hosts are not known, or if there is any uncertainty about them, then the attribution system may use a list of candidate hostIDs from which it can choose a set of possible attributions. For this purpose, a list of (SourceIP, DestinationIP) can either be maintained by the PAS itself or be obtained from connection records maintained by firewalls, intrusion detection systems or hosts themselves.

Figure 7:
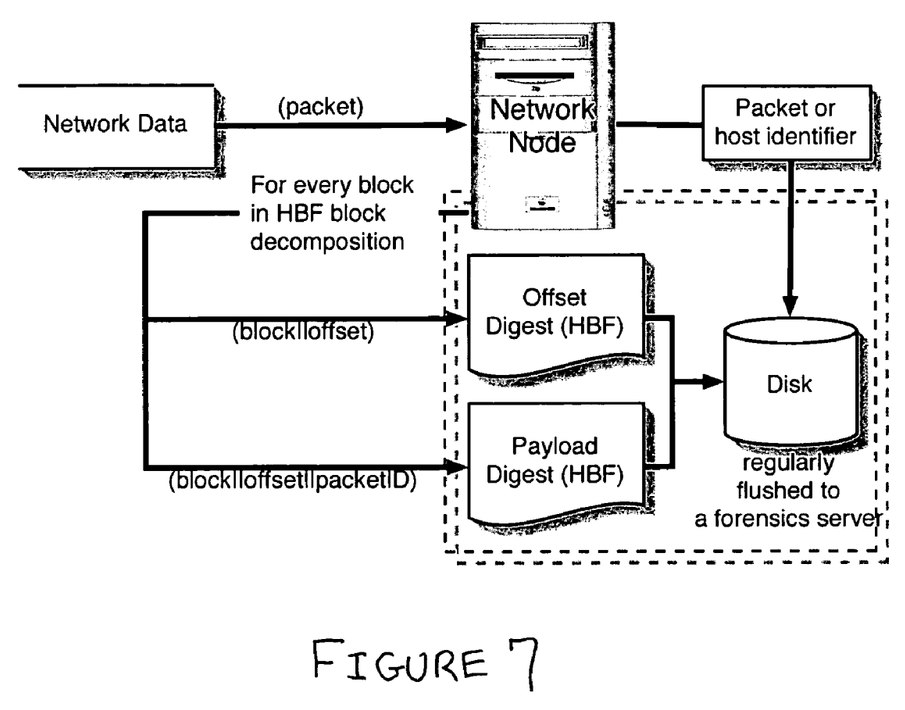
FIG. 7 illustrates an exemplary system consistent with the present invention.

As depicted in FIG. 7, the exemplary system is organized in several tiers. The system sniffs the network and produces the blocks in the hierarchical block decomposition of the packet payload. For every such block, the information (content, offset, hostID) is available, and the system may maintain:
1. a block digest (optional): a HBF storing the hashes of blocks of payload, (content).
2. an offset digest: a HBF storing the hashes of content concatenated with its offset in the payload, (content||offset).
3. a payload digest: a HBF storing, for every block (content||offset) in the offset digest, the corresponding (content||offset||hostID).

Note that a BBF may be used instead of an HBF but HBF leads to fewer false positives. The main advantage of using a block digest is to have better accuracy answering whether a block has been seen at all (without knowing the offset). Without it, one would have to query the offset digest with all possible offsets (although the extra space afforded by not having a block digest increases the accuracy of the offset digest, the testing of every offset gives both designs roughly equivalent accuracy). So, one can omit the block digest and save storage to increase the accuracy of the offset digest. Nevertheless, if there are lots of queries for small excerpts, it may be beneficial to keep a block digest in order to quickly determine when an excerpt has not been seen so that further futile processing may be eliminated.

Based on network load, required accuracy and granularity of attribution, $FP_o$, block size, and time-interval to flush an HBF to disk may be determined a priori. When deployed, the exemplary PAS maintains an HBF of offset digests and payload digests. It may also maintain a list of hostIDs if necessary. Upon the predetermined time-interval, the HBF and the list of hostIDs for the interval may be flushed to disk. The exemplary implementation of PAS maintains a list of hostIDs of the form (SourceIP, DestinationIP) for each HBF.

The apparatus can be implemented in software or in hardware. Software implementation is suitable for low to moderate traffic volumes. FIG. 7 illustrates a possible software implementation of the apparatus. High volume networks may require hardware implementation to keep up with the traffic passing through the node. In this case, each interface in a router can generate HBFs and network processors can be used to implement HBFs in the line-cards. The router's logging mechanism can be used to dump the HBFs to a remote collection server where the HBFs can be archived for future query processing. Moreover, a hardware implementation of the proposed apparatus allows network components to ship with payload attribution "out-of-the-box." A payload attribution capable network component is useful even in low or moderate volume traffic as the component can be used to track malware and company confidential information across network borders.

Deployment Scenarios of the Apparatus

Ideally, deploying the PAS at a traffic concentration point of a network would be sufficient. However, source IP addresses can be spoofed which means the PAS would not be able to attribute an excerpt to its rightful owner. Note, however, PAS is concerned with attributing payload. This can be anything from a mundane web session to a single-packet UDP worm. Thanks to randomization of TCP initial sequence numbers it is difficult to spoof a useful TCP session when the hosts are in different broadcast domains. Only blind-attacks can succeed by spoofing. A good example would be a worm like Slammer which uses single UDP packet to propagate blindly across networks. Keeping this in mind, the attribution process can be divided into four different scenarios. What follows is a discussion of various deployment strategies that accommodates spoofing on the Internet and applications of PAS.

Destination Attribution: In this case, a PAS may be used to attribute an excerpt to its destination. Since it is not possible (or more precisely, useless) to spoof a destination IP address, deploying a PAS at a traffic concentration point in the local network is sufficient. Viruses and worms spread so fast they often infect most of the network before an administrator can obtain enough information to contain them. With the help of PAS, the administrator can look at past network traffic to identify hosts that have received a particular worm and quarantine them. In this scenario, the PAS needs to maintain a list of destination addresses within one's networks. In addition, destination attribution is not affected by spoofing in anyway.

Local Source Attribution: A PAS may be used to attribute an excerpt to a local source. Since source addresses can easily be spoofed, in order to make the attribution reliable, PAS has to be deployed in the local network on every subnet. This would help one to narrow down the source to its subnet. Also note that the HBF parameters (space vs. accuracy) can be tuned to optimize space utilization in this hierarchical deployment. For example, a PAS at the edge of the network which sees lot of traffic can maintain HBFs with coarse parameters to save space whereas the ones in the subnets can have more accurate HBFs. Local source attributions are useful to prove or disprove an alleged policy violation like, uploading a file that contains trade secrets.

Foreign Source Attribution: Foreign source attribution is when we use a PAS to attribute an excerpt to a source beyond the network boundary where PAS is installed. Deploying PAS at the core of a network to make source IP reliable may be impractical. One can, however, use some of the source attribution techniques proposed for flooding attacks at the core. For example, SPIE can be used to trace an excerpt to a foreign source if a PAS maintains MD5 hashes of "non-mutable headers" of packets instead of (SourceIP, DestinationIP). When the trace reaches the edge of the network, these MD5 hashes can then be used by SPIE to trace the excerpt to its actual source through the core of the network. Effectiveness of this method relies on the ability of SPIE to keep the MD5 hashes for a prolonged period of time. Another method, is to use a packet marking scheme proposed in I. Hamadeh and G. Kesidis, "Packet marking for traceback of illegal content distribution," *Proceedings of International Conference on Cross-Media Service Delivery* (*CMSD*), Santorini, Greece, May 2003, I. Hamadeh and G. Kesidis, "Performance of ip address fragmentation strategies for ddos traceback," *Proceedings of IEEE IPCOM*, Kansas City, October 2003, which does not require any storage at the core. When using this method, a PAS (or a firewall for that matter) can simply replace the source address of a packet with the IP address encoded in the packet's Fragment-Id field. Then, the source can be traced to the closest router that employs this address encoding scheme. In both cases, note that PAS only needs to be deployed in the traffic concentration point of the destination network. Again, such an elaborate setup is needed only when we need to traceback an excerpt involved in a blind-attack, like the Slammer worm. Excerpts of most connection oriented sessions can be attributed to its source just by using the PAS at the destination network.

Full Attribution: For the sake of completeness, full attribution is simply a combination destination attribution and one of the source attributions. Therefore, deployment strategy is a superset of the ones discussed above.

§4.6 Refinements and Alternatives

So far, the blocking of payload was described as being blocked to a fixed size at each level. Robustness of HBF can further be improved by making the block sizes depend on the values of payloads instead of an a priori value. This method is generally known as value-based hashing. A finger-printing algorithm, such as Rabin Fingerprints, can be used to determine the block boundaries on the payload by computing repeated hashes on the payload. A block boundary is determined by a particular hash value (say, 0) or by a maximum length whichever comes first. In an HBF, value-based blocking may be done at the lowest level and blocks of various sizes are determined. Subsequent levels may simply combine two consecutive blocks together to form a single block.

Given a payload, a payload attribution system reduces the uncertainty about the actual source and destination(s) of the payload, within a given target time interval. The more this uncertainty can be reduced, the better the attribution system. More specifically, let $S=\{s_1, s_2, \ldots s_m\}$ be the set of all possible hosts that could have originated a payload and let $D=\{d_1, d_2, \ldots d_m\}$ be the set of all possible hosts that could have received it. Now, given a payload P and a time interval $(t_i, t_j)$, a source attribution system S, returns a candidate subset X of S such that any element not in this subset is definitely not the source. Any element in the subset that is not an actual source is a false positive. A destination attribution system can be defined in a similar manner (and also a full attribution system which reduces the uncertainty of both source and destination).

Ideally a PAS would have no uncertainty in its association. However, any practical design of a PAS faces some serious challenges that need to be met.

As described above with reference to FIG. 1, an implementation of a payload attribution system has two main components: a payload processing component and a query processing component. In payload processing, a payload is examined, transformed in some manner and transferred to a permanent storage device. Depending on the application, it can process every single packet it sees or it can selectively process packets. In the query processing component, a query is received, appropriate data is retrieved from storage, interpreted and attribution information are provided. Each component presents its own set of challenges. For example, during payload processing, the system should process packets at line-speed and store the results to a much slower permanent storage device. During the query phase, the system should be aware of and comply with accuracy and privacy requirements set forth by the security policies that govern a network. Although the following features are not required, a reliable payload attribution system should exhibit these properties:

Succinct Representation of Payload. Storing raw payload presents three major hurdles. First, it requires a lot of memory in the network component itself. Second, transferring raw network data to permanent storage creates a bottleneck due to slower speeds of current storage devices. Third, longevity of stored data depends on the capacity of the storage device. Capacity of storage devices is still a limiting factor for storing raw network data for a prolonged period of time. In order to overcome these hurdles, payloads must be represented in a succinct form.

Efficient Utilization of Resources. Processing of payload should ideally be done at line-speed so that it does not create any bottlenecks. Moreover, fast memory is a scarce resource therefore processing should utilize the memory efficiently.

Robustness Against Transformations. Packets can go through two types of transformations: (1) network-induced transformations (2) malicious transformations. Packet encapsulation, and fragmentation are examples of network-induced transformations. Although such transformations are rare, a payload attribution system should handle them and NAT translations consistently such that results are not impacted negatively. Malicious transformation, on the other hand, is a more serious threat to the reliability of the system.

Accuracy of Results. Depending on the data structures and algorithms used to store payload and answer queries, results from the system are, at best, probabilistic. Therefore, the system should quantify the confidence in its results and preferably send it along with the results. Acceptable accuracy of attribution depends on how the results from the system are used. For instance, to be used in a court of law, it would be useful to have the highest level of accuracy possible whereas to be used for network troubleshooting such a high level of accuracy is not as necessary.

Privacy. Obviously, examining and storing payload raises many privacy concerns. Therefore, a payload attribution system should have proper mechanisms in place to guarantee the privacy of users in the network where it is deployed. Also, proper authorization mechanisms should be in place to ensure information is disclosed only to authorized parties. Precautions should also be taken to minimize the exposure of information in the event system itself is compromised.

Compatibility with Existing Systems. Although a payload attribution system can function independent of any traceback mechanisms, from a pragmatic point of view it is useful if the system can complement many proposed traceback systems as described below.

Figure 8:
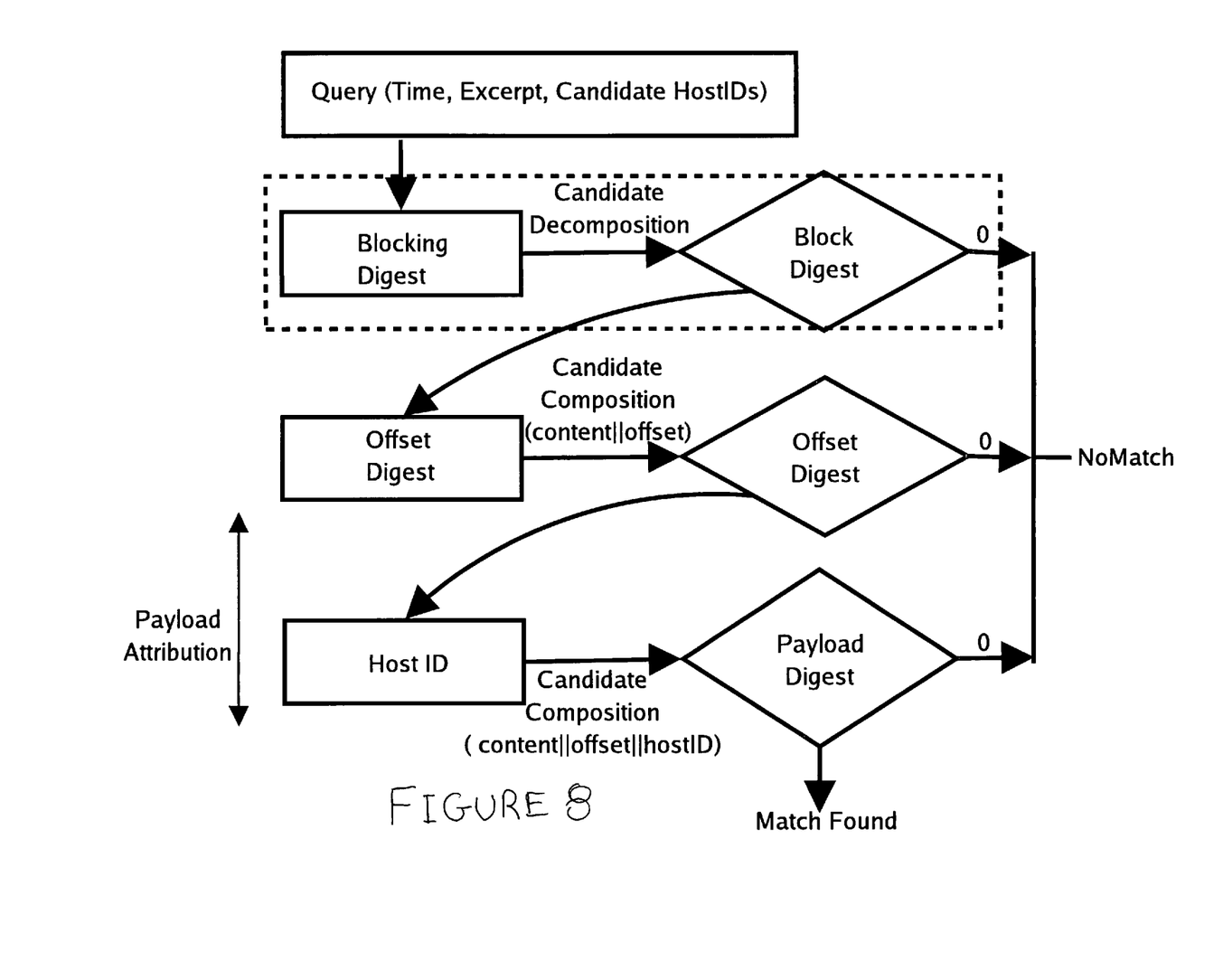
FIG. 8 is a flow diagram showing query processing in a manner consistent with the present invention.

Given an excerpt and a time interval, the exemplary PAS described above first retrieves the HBFs and list of hostIDs that fall within the target time interval from the disk. Then whether the excerpt was seen by the HBF is verified. In order to achieve this all possible sliding windows and offsets are tried. For each possible alignment, the excerpt is blocked and whether all the blocks are present in the HBF is verified. If any of the blocks cannot be found, then the query string has not been seen by the HBF. If every single block is verified by the HBF, then the system needs to verify that they appear in the same order as in the query string. To verify the order, all possible offsets are appended to the strings (content||offset) and their positions are verified. Based on their offset, it may be possible to go to a higher level in the HBF hierarchy and increase the confidence as described earlier. Now, in order to attribute the query string, the hostIDs from the list being maintained by the PAS for the particular HBF being queried is appended and the (content||offset||hostID) is verified. FIG. 8 depicts how a query is processed in such a setup.

Note that when the largest offset falls somewhere in the middle of the query string, the query has spanned more than one packet. In which case, the system can start matching the rest of the string as a new string by starting with of f set=0. This makes it possible to match strings that span multiple packets.

Although some of the embodiments described above used hashing functions to generate hashes, which were stored in an HBF, the present invention is not limited to such embodiments. For example, embodiments consistent with the present invention may use other digesting functions to generate "digests". Such digests may be stored in an hierarchical data structures. Similarly, the blocks alone may be digested, or blocks plus offsets and/or blocks plus attribute information may be digested.

§4.7 CONCLUSIONS

As can be appreciated from the foregoing, embodiments consistent with the present invention may permit payload information (e.g., information within a payload, or information spanning two or more payloads) to be attributed to earlier network flow information. Compact data structures permit data storage reduction, while permitting efficient query processing with a low level of false positives.

What is claimed is:

1. A computer-implemented method comprising:
 a) accepting, by a payload attribution system, a payload content and attribute information of a flow;
 b) segmenting, by the payload attribution system, the payload content into a first set of blocks;
 c) for each of the blocks of the first set of blocks, generating, by the payload attribution system, a summary of each of
  (1) the block,
  (2) the block together with corresponding offset information, and
  (3) the block together with the corresponding offset information and the attribute information of the flow, using at least one summarizing function; and
 d) storing, by the payload attribution system, for each of the blocks of the first set of blocks, the generated summaries on a computer-readable storage device.

2. The computer-implemented method of claim 1 further comprising:
 e) accepting, from a query requestor, a query including a query parameter which includes at least an arbitrary excerpt of payload content;
 f) determining a summary of the query parameter;
 g) finding one or more stored summaries that match the summary of the query parameter, by searching the stored summaries;
 h) obtaining flow attributes associated with the found one or more stored summaries; and
 i) presenting the flow attributes associated with the found one or more stored summaries to the query requestor.

3. The computer-implemented method of claim 1 wherein the attribute information of the flow includes at least one of a source Internet protocol address and a destination Internet protocol address.

4. The computer-implemented method of claim 1 wherein the attribute information of the flow includes at least one of a source port and a destination port.

5. The computer-implemented method of claim 1 wherein each of the at least one summarizing functions is a hash function.

6. The computer-implemented method of claim 1 further comprising:
 segmenting, by the payload attribution system, the payload content into a second set of blocks, wherein each of the blocks of the second set is a concatenation of at least two blocks of the first set;
 for each of the blocks of the second set of blocks, generating, by the payload attribution system, a summary of each of
  (1) the block,
  (2) the block together with corresponding offset information, and (3) the block together with the corresponding offset information and the attribute information of the flow, using the at least one summarizing function;

storing, by the payload attribution system, for each of the blocks of the second set of blocks, the generated summaries on the computer-readable storage device, wherein the generated summaries, of the first and second sets of blocks, stored on the computer-readable storage device are stored in a hierarchical data structure in which two levels of the hierarchy correspond to the first and second sets of blocks.

7. Apparatus comprising:

a) at least one processor; and
b) at least one non-transitory computer-readable storage device storing processor executable instructions which, when executed by the at least one processor, perform a method including 1) accepting a payload content and attribute information of a flow;
2) segmenting the payload content into a first set of blocks;
3) for each of the blocks of the first set of blocks, generating a summary of each of
    (A) the block,
    (B) the block together with corresponding offset information, and
    (C) the block together with the corresponding offset information and the attribute information of the flow,
using at least one summarizing function; and
4) storing, for each of the blocks of the first set of blocks, the generated summaries on the non-transitory computer-readable storage device.

* * * * *